(12) United States Patent
Tamegai et al.

(10) Patent No.: US 7,863,833 B2
(45) Date of Patent: Jan. 4, 2011

(54) DC/DC CONVERTER CONTROL CIRCUIT, AND POWER SUPPLY APPARATUS, LIGHT EMITTING APPARATUS AND ELECTRONIC DEVICE USING THE SAME

(75) Inventors: Yoichi Tamegai, Kyoto (JP); Isao Yamamoto, Kyoto (JP); Kyoichiro Araki, Kyoto (JP)

(73) Assignee: Rohm Co., Ltd. (JP)

( * ) Notice: Subject to any disclaimer, the term of this patent is extended or adjusted under 35 U.S.C. 154(b) by 433 days.

(21) Appl. No.: 11/951,408

(22) Filed: Dec. 6, 2007

(65) Prior Publication Data

US 2008/0136342 A1 Jun. 12, 2008

Related U.S. Application Data

(63) Continuation of application No. PCT/JP2006/311065, filed on Jun. 2, 2006.

(30) Foreign Application Priority Data

Jun. 6, 2005 (JP) .............................. 2005-166046

(51) Int. Cl.
*G05F 1/00* (2006.01)

(52) U.S. Cl. .................... 315/307; 315/291; 315/308

(58) Field of Classification Search ............. 315/209 R, 315/218, 219, 221, 225, 224, 177, 276, 279, 315/282, 287, 291, 299, 300, 301, 302, 307, 315/308, 362; 363/13, 123, 124–140; 361/35, 361/36, 38, 88, 90, 91.1; 323/237, 238, 240, 323/301, 304, 305, 318, 320, 321, 328, 349, 323/351, 355
See application file for complete search history.

(56) References Cited

U.S. PATENT DOCUMENTS

2004/0136206 A1 7/2004 Kinoshita et al.

(Continued)

FOREIGN PATENT DOCUMENTS

JP 1-318543 A 12/1989

(Continued)

OTHER PUBLICATIONS

Written Opinion of the International Searching Authority for PCT/JP2006-311065; date of mailing: Aug. 29, 2006.

(Continued)

*Primary Examiner*—Douglas W Owens
*Assistant Examiner*—Jianzi Chen
(74) *Attorney, Agent, or Firm*—Cantor Colburn LLP

(57) ABSTRACT

A control circuit is provided for a separately excited DC/DC converter which directly monitors output voltage to detect a short-circuit state, and performs overcurrent protection. A switching controller of the control circuit controls a switching operation of a switching transistor of the separately excited DC/DC converter. A voltage comparator compares the output voltage and a threshold voltage, to detect the short-circuit state. After a predetermined start-up time has elapsed after beginning start-up of the separately excited DC/DC converter, when the voltage comparator detects the short-circuit state, the switching controller halts the switching operation of the switching transistor, and makes detection of the short-circuit state by the voltage comparator non-operative before elapse of the start-up time. After detecting the short-circuit state and halting the switching operation of the switching transistor for a predetermined halt time, the switching controller begins start-up of the separately excited DC/DC converter once again.

11 Claims, 3 Drawing Sheets

U.S. PATENT DOCUMENTS

2005/0024898 A1 * 2/2005 Yang et al. .............. 363/21.12

FOREIGN PATENT DOCUMENTS

| JP | 2-49332 U | 4/1990 |
| JP | 5-328711 A | 12/1993 |
| JP | 8-234852 A | 9/1996 |
| JP | 11-89220 A | 3/1999 |
| JP | 11-252907 A | 9/1999 |
| JP | 2002-374671 A | 12/2002 |
| JP | 2004-71428 A | 3/2004 |
| JP | 2004-104942 A | 4/2004 |
| JP | 2004-208382 A | 7/2004 |

OTHER PUBLICATIONS

International Search Report for International Application No. PCT/JP2006/311065 mailed Aug. 29, 2006.

Chinese Office Action for Chinese Patent Application No. 200680001887.X issued Jan. 23, 2009 with English Translation.

* cited by examiner

US 7,863,833 B2

DC/DC CONVERTER CONTROL CIRCUIT, AND POWER SUPPLY APPARATUS, LIGHT EMITTING APPARATUS AND ELECTRONIC DEVICE USING THE SAME

CROSS REFERENCE TO RELATED APPLICATIONS

This is a Continuation of International Application No. PCT/JP2006/311065, filed on 2 Jun. 2006. Priority under 35 U.S.C. §119(a) and 35 U.S.C. §365(b) is claimed from Japanese Application No. 2005-166046, filed 6 Jun. 2005, the disclosure of which is also incorporated herein by reference.

BACKGROUND OF THE INVENTION

1. Field of the Invention

The present invention relates to a switching power supply, and a drive system for a DC/DC Converter.

2. Description of the Related Art

A step-up type of switching power supply for generating voltage higher than an input voltage is widely used in various electronic devices. This step-up type of switching power supply is provided with a switching element, and an inductor or a transformer, and by putting the switching element ON or OFF in a time-division way, a back electromotive force is generated in the inductor or the transformer, and input voltage is stepped up and outputted.

Among such switching power supplies, two types of insulating-type DC/DC converters that use the transformer are known: a self-excited type and a separately excited type. These types are selected in accordance with a characteristic required of the switching power supply, such as range of output voltage, or the like. In the insulating-type of DC/DC converter, when a switching transistor is OFF, a current flows on a primary side of the transformer, and energy is stored in the transformer. When the switching transistor is OFF, energy stored in the transformer on a secondary side of the transformer is transferred to an output capacitor, via a rectifier diode, as a charging current, and the output voltage rises.

In this type of separately excited DC/DC converter, when an overcurrent flows due to a short-circuit of a load, or the like, since the transformer is saturated, or reliability of the switching transistor is effected, there are cases in which an overcurrent protection circuit is provided. For example, Patent Document 1 discloses technology in which the current on the primary side of the transformer is monitored to detect an overcurrent state.

Patent Document 1: Japanese Patent Application, Laid Open No. 2002-374671

However, in the technology described in the abovementioned document, in which the current on the primary side of the transformer is monitored, when a load suddenly short-circuits, there have been cases in which current flowing on the primary side of the transformer suddenly rises at a speed exceeding response speed of a voltage comparator, so that overcurrent protection response is delayed, and the overcurrent flows in the switching transistor.

SUMMARY OF THE INVENTION

The present invention was made in view of these issues, and a general purpose thereof is the provision of a control circuit for a DC/DC converter that performs overcurrent protection.

An embodiment of the present invention relates to a control circuit for controlling a switching operation of a switching transistor of a separately excited DC/DC converter. The control circuit for controlling the switching operation of the switching transistor of the separately excited DC/DC converter includes a switching controller for controlling the switching operation of the switching transistor, and a voltage comparator for comparing an output voltage of the separately excited DC/DC converter and a predetermined threshold voltage, to detect a short-circuit state. After a predetermined start-up time has elapsed after beginning start-up of the separately excited DC/DC converter, when the voltage comparator detects the short-circuit state, the switching controller halts the switching operation of the switching transistor, and makes detection of a short-circuit state by the voltage comparator non-operative before elapse of the start-up time.

According to this embodiment, it is possible to distinguish between a state in which a load short-circuits and the output voltage decreases, and a state in which, before the output voltage at start-up time rises to a target value thereof, the output voltage is lower than the threshold voltage, and it is possible to halt the switching transistor and realize circuit protection only in cases in which the load has really short-circuited.

After detecting the short-circuit state and halting the switching operation of the switching transistor for a predetermined halt time, the switching controller may begin the start-up of the separately excited DC/DC converter once again. At a time of a short-circuit of the load, in cases in which a long-term short-circuit of the load is maintained, by halting the switching transistor for the predetermined halt time, since there is intermittent operation in which current flows during the start-up time and is shut off during the halt time, it is possible to prevent a large current flowing continuously in the switching transistor or transformer.

The start-up time may be set to be longer than the time required for the output voltage to become higher than the threshold voltage, after beginning the start-up of the separately excited DC/DC converter.

When the output voltage is continuously below the threshold voltage for a predetermined short-circuit detection period, according to the voltage comparator, the switching controller may halt the switching operation of the switching transistor. In such cases, the long-term short-circuit state can be preferably detected and the circuit protection can be performed.

The switching controller may include a state machine for holding a control state of the switching transistor. The state machine may have three modes: a start-up mode in which detection of a short-circuit state by the comparator is made non-operative, while executing a step-up operation by the separately excited DC/DC converter, a normal mode in which detection of a short-circuit state by the voltage comparator is performed, and a halt mode in which the step-up operation by the separately excited DC/DC converter is halted. The state machine may transit to the normal mode after the start-up time has elapsed after transiting to the start-up mode; the state machine may transit to the halt mode when the voltage comparator detects a short-circuit state when in the normal mode; and the state machine may transit to the start-up mode after the predetermined halt time has elapsed after transiting to the halt mode.

By defining three states using the state machine, and transiting in accordance with a drive state, it is possible to preferably execute the abovementioned short-circuit protection.

In the normal mode, when the output voltage of the separately excited DC/DC converter decreases due to driving the load, the state machine may transit to the start-up mode. In such cases, the output voltage can be increased once again by the start-up mode, and during that time, the detection of the short-circuit state can be made non-operative.

The switching controller may include a pulse width modulator which generates a pulse signal, a driver circuit which drives the switching transistor based on a pulse signal, and a hysteresis comparator which compares the output voltage and a threshold voltage set in a vicinity of a target value of the output voltage. The pulse width modulator may gradually change a duty ratio of the pulse signal in the start-up mode, and, in the normal mode and the halt mode, may fix the duty ratio of the pulse signal at a predetermined value; and the driver circuit may drive the switching transistor based on the pulse signal in the start-up mode and the normal mode, and may halt driving of the switching transistor in the halt mode.

In such cases, it is possible to execute a soft start in the start-up mode. In addition, in the normal mode, since the switching transistor is driven at the fixed duty ratio, irrespective of the output voltage, the output voltage gradually increases. After that, when the output voltage reaches a first threshold voltage of the hysteresis comparator, the switching transistor is halted, and the output voltage gradually decreases. When the output voltage decreases to a second threshold voltage of the hysteresis comparator, driving of the switching transistor is restarted. As a result, in the normal mode, the output voltage is stabilized between the first threshold voltage and the second threshold voltage. Furthermore, by putting the machine into a halt mode when there is a short-circuit, a step-up operation can be halted and the circuit protected.

The switching controller may further include a timer circuit, and the state machine may operate using the timer circuit for required time measurement.

The switching controller and the voltage comparator may be integrated on one semiconductor substrate. The integration here may include cases in which all component elements of the circuit are formed on the semiconductor substrate, and cases in which main component elements of the circuit are integrated, with some resistors, capacitors, or the like, for adjustment of a circuit constant, arranged outside of the semiconductor substrate.

Another embodiment of the present invention relates to a control circuit that controls a switching operation of the switching transistor of a self-excited DC/DC converter. This control circuit is provided with a switching controller that controls a switching operation of the switching transistor, and a voltage comparator that compares output voltage of the self-excited DC/DC converter and a predetermined threshold voltage, to detect a short-circuit state. After a predetermined start-up time has elapsed after beginning start-up of the self-excited DC/DC converter, when the voltage comparator detects the short-circuit state, the switching controller halts the switching operation of the switching transistor, and males detection of a short-circuit state by the voltage comparator non-operative before elapse of the start-up time.

A further embodiment of the present invention is a power supply apparatus. This power supply apparatus is provided with a separately excited DC/DC converter that includes a switching transistor, and in which a step-up operation is controlled by putting the switching transistor ON or OFF, and a control circuit that controls putting the switching transistor ON or OFF.

According to this embodiment, it is possible to preferably protect the switching transistor and the transformer of the separately excited DC/DC converter from overcurrent.

A still further embodiment of the present invention is a light-emitting device. This light-emitting device is provided with the abovementioned power supply apparatus, and a light-emitting element that is driven by an output voltage of the separately excited DC/DC converter of the power supply apparatus.

According to this embodiment, when the light-emitting element, which is a load, is driven normally without a short-circuit or the like occurring, it is possible to stably emit light from the light-emitting element, and in cases of a short-circuit, it is possible to protect the circuit from overcurrent.

A further embodiment of the present invention is a battery-driven electronic device. This battery-driven electronic device is provided with an imaging unit, and the abovementioned light-emitting device, used as a flash when talking an image with the imaging unit, and the light-emitting device steps up the battery voltage to drive a light-emitting element.

According to this embodiment, in cases in which the light-emitting element, which is connected to the power supply apparatus as a load, short-circuits, it is possible to prevent a large current from flowing out continuously for a long time from the battery, and it is possible to curtail heat generation in the electronic device.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
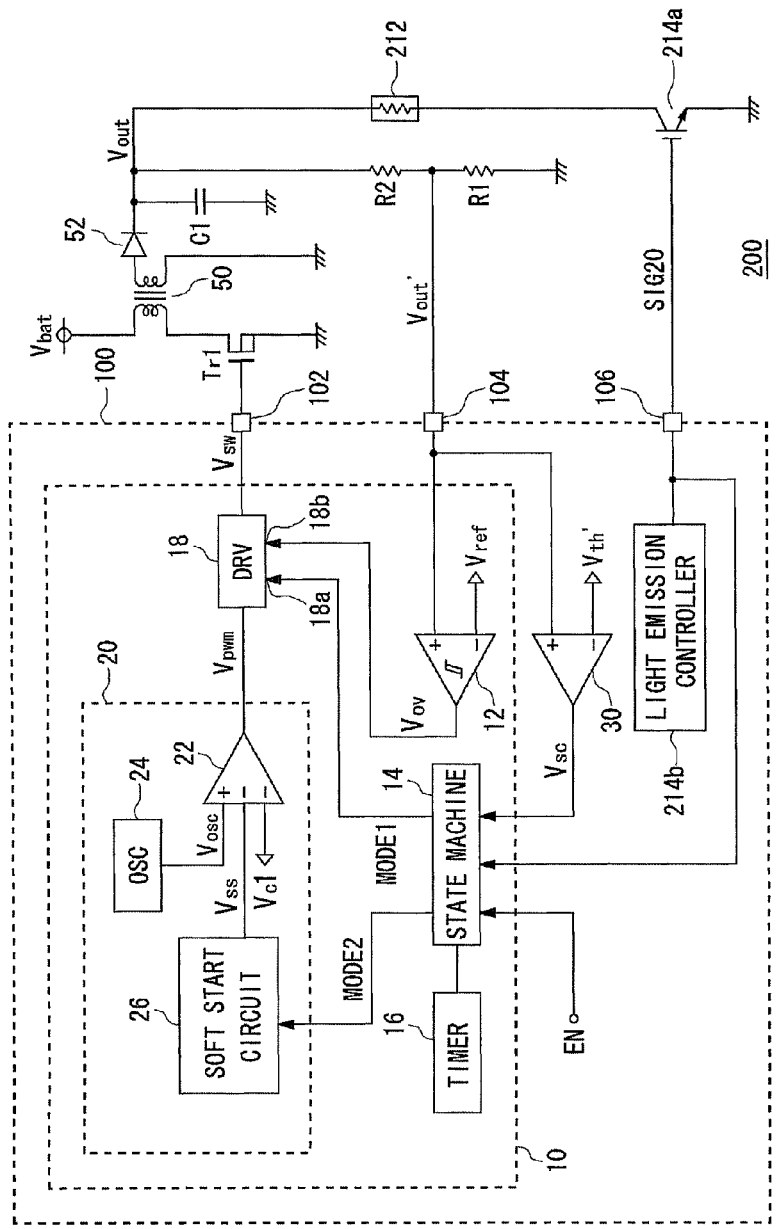
FIG. 1 is a circuit diagram showing a configuration of a light-emitting device according to an embodiment.

FIG. 1 is a circuit diagram showing a configuration of a light-emitting device 200 according to the embodiment. This light-emitting device 200 is installed in an electronic device provided with a camera, and when an image is taken by the camera, functions as a light source used as a flash.

Figure 2:
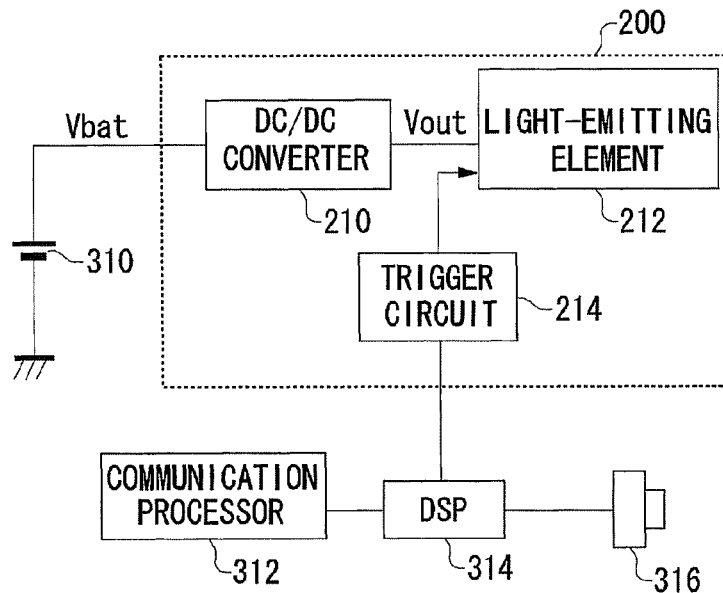
FIG. 2 is a block diagram showing a configuration of an electronic device in which the light-emitting device of FIG. 1 is installed.

FIG. 2 is a block diagram showing a configuration of the electronic device 300 in which the light-emitting device of FIG. 1 is installed. In the present embodiment, the electronic device 300 is a mobile telephone in which a camera is installed, and is provided with a battery 310, a communication processor 312, a DSP (Digital Signal Processor) 314, an imaging unit 316, and the light-emitting device 200.

The battery 310 is, for example, a lithium-ion battery, and outputs a voltage of approximately 3 to 4 volts, as a battery voltage Vbat. The DSP 314 is a block that performs overall control of the entire electronic device 300, and is connected to the communication processor 312, the image unit 316, and the light-emitting device 200. The communication processor 312 includes an antenna, a radio frequency circuit, and the like, and is a block that performs communication with a base station. The imaging unit 316 is an imaging device such as a CCD (Charge Coupled Device), a CMOS sensor, or the like.

The light-emitting device 200 is provided with a separately excited DC/DC converter 210, a light-emitting element 212, and a trigger circuit 214. A xenon tube or the like is preferably used as the light-emitting element 212. The separately excited DC/DC converter 210 steps up the battery voltage Vbat supplied from the battery 310, and supplies a drive voltage (below, referred to as output voltage) Vout of approximately 300 volts to the light-emitting element 212. The drive voltage Vout is stabilized at a target voltage Vtgt of a predetermined level. The trigger circuit 214 is a circuit that controls timing of light emission of the light-emitting device 200. The light-emitting element 212 emits light in synchronization with image-taking by the imaging unit 316.

The explanation returns to FIG. 1. The light-emitting device 200 includes a control circuit 100, a switching transistor Tr1, a transformer 50, a rectifier diode 52, an output capacitor C1, a first resistor R1, a second resistor R2, a light-emitting element 212, and an IGBT (Insulated Gate Bipolar Transistor) 214a. The control circuit 100 is an integrated circuit that is integrated on one semiconductor substrate. The switching transistor Tr1 is additionally integrated on this integrated circuit.

The control circuit 100, the switching transistor Tr1, the transformer 50, the rectifier diode 52, the output capacitor C1, the first resistor R1, and the second resistor R2, shown in FIG. 1, correspond to the separately excited DC/DC converter 210 of FIG. 2. Furthermore, the IGBT 214a and a light emission controller 214b of FIG. 1 correspond to the trigger circuit 214 of FIG. 2. The IGBT 214a is provided on a current pathway of the light-emitting element 212, and light emission of the light-emitting element 212 is controlled by putting the light-emitting element ON or OFF.

The control circuit 100 controls gate voltage of the switching transistor Tr1 of the separately excited DC/DC converter 210, to control switching operations, that is, ON and OFF operations. The control circuit 100 switches between three modes: a start-up mode that executes a step-up operation by the separately excited DC/DC converter 210, a normal mode, and a halt mode that halts the step-up operation by the separately excited DC/DC converter 210, and controls the switching transistor Tr1. The control circuit 100 is provided with a function for detecting a short-circuit state of a load, details of which will be described below, performing short-circuit detection in the normal mode, and making short-circuit detection non-operative in the start-up mode.

The control circuit 100 is provided with an output terminal 102, a feedback terminal 104, and a light emission control terminal 106. The output terminal 102 is connected to a gate of the switching transistor Tr1, and a switching signal Vsw, which is an output signal of the control circuit 100, is outputted. The output voltage Vout of the separately excited DC/DC converter 210, which is divided by the first resistor R1 and the second resistor R2, is fed back to the feedback terminal 104. The light emission control terminal 106 is connected to a gate of the IGBT 214a.

The battery voltage Vbat is applied to one end of a primary coil of the transformer 50, and a drain of the switching transistor Tr1 is connected to the other end. The switching transistor Tr1 is an N-channel MOS transistor, whose source is grounded.

One end of a secondary coil of the transformer 50 is grounded, and an anode of the rectifier diode 52 is connected to the other end. A cathode of the rectifier diode 52 is grounded via the output capacitor C1. The output voltage Vout of the separately excited DC/DC converter 210 occurs at a connection point of the output capacitor C1 and the rectifier diode 52. This output voltage Vout is supplied to the light-emitting element 212.

The control circuit 100 includes a switching controller 10, a voltage comparator 30, and the light emission controller 214b. The switching controller 10 generates the switching voltage Vsw based on voltage fed back to the feedback terminal 104, and controls switching operations of the switching transistor Tr1. The voltage comparator 30 compares the output voltage Vout of the separately excited DC/DC converter 210 and a predetermined threshold voltage Vth, to detect a short-circuit state. The light emission controller 214b generates a light emission control signal SIG20, and controls a base voltage of the IGBT 214a.

When the voltage comparator 30 detects a short-circuit state, after a predetermined start-up time Tp1 has elapsed after beginning start-up of the separately excited DC/DC converter 210, the switching controller 10 halts a switching operation of the switching transistor Tr1, and makes detection of a short-circuit state by the voltage comparator 30 non-operative before the elapse of the start-up time Tp1. A detailed explanation is given below concerning a configuration and operation of the switching controller 10 and the comparator 30.

The switching controller 10 includes a hysteresis comparator 12, a state machine 14, a timer circuit 16, a driver circuit 18, and a pulse width modulator 20.

The pulse width modulator 20 generates a pulse width modulation signal Vpwm in which pulse varies, at a constant frequency, and outputs to the driver circuit 18. The driver circuit 18 is configured to include an inverter and the like, and generates the switching voltage Vsw based on the pulse width modulation signal Vpwm, to drive the switching transistor Tr1. This driver circuit 18 is provided with two enabling terminals 18a and 18b, and a mode signal MODE1 outputted from the hysteresis comparator 12 and the state machine 14, described below, and an overvoltage detection signal Vov is inputted to each of the enabling terminals 18a and 18b.

The hysteresis comparator 12 detects an overvoltage state in which the output voltage Vout of the separately excited DC/DC converter 210 is higher than a predetermined threshold voltage, and generates the overvoltage detection signal Vov. This overvoltage detection signal Vov has a high level in the overvoltage state, and a low level otherwise. When the overvoltage detection signal Vov has a high level, irrespective of a pulse width modulation signal Vpwm outputted from the pulse width modulator 20, the driver circuit 18 halts a switching operation of the switching transistor Tr1, and when the overvoltage detection signal Vov has a low level, drives the switching transistor Tr1 based on the pulse width modulation signal Vpwm.

As described above, the output voltage Vout of the separately excited DC/DC converter 210 is divided in the feedback terminal 104, and a feedback voltage Vout'=Vout×R1/(R1+R2) is fed back. The feedback voltage Vout' inputted to the feedback terminal 104 is inputted to a plus (non-inverting) terminal of the hysteresis comparator 12, and a reference voltage Vref is inputted to a minus (inverting) terminal, respectively. When its output is at a low level, the hysteresis comparator 12 compares a first threshold voltage Vref1 and the feedback voltage Vout', and when its output is at a high level, compares a second threshold voltage Vref2 and the feedback voltage Vout'. Here, a relationship expressed as Vref1>Vref2 is established between the first threshold voltage Vref1 and the second threshold voltage Vref2.

When the output voltage Vout rises, by a step-up operation, and reaches the first threshold voltage given by Vmax=Vref1×(R1+R2)/R1, the overvoltage detection signal Vov outputted from the hysteresis comparator 12 has a low level, and when the output voltage Vout decreases, by halting the step-up operation, and reaches the second threshold voltage given by Vmin=Vref2×(R1+R2)/R1, the overvoltage detection signal Vov has a high level. The reference voltage Vref of the hysteresis comparator 12 is set so that Vref=Vtgt× R1/(R1+R2) is established, using the target voltage Vtgt of the output voltage Vout of the separately excited DC/DC converter 210.

The pulse width modulator 20 includes a voltage comparator 22, an oscillator 24, and a soft start circuit 26. The oscillator 24 generates a cyclic frequency Vosc of a triangular waveform or a sawtooth waveform. The soft start circuit 26 generates a soft start voltage Vss that gradually increases in the start-up mode. The cyclic Voltage Vosc and the soft start voltage Vss are inputted to a plus (non-inverting) terminal of the voltage comparator 22, and a fixed voltage Vc1 is applied to the minus (inverting) terminal. The maximum value of the soft start voltage Vss is set to be equal to the fixed voltage Vc1. The voltage comparator 22 compares the cyclic voltage Vosc and the lower of the fixed voltage Vc1 and the soft start voltage Vss. Accordingly, with regard to the pulse width modulation signal Vpwm outputted from the pulse width modulator 20, a duty ratio gradually becomes large in the start-up mode, and in the normal mode and the halt mode, the duty ratio is fixed at a predetermined value determined by the fixed voltage Vc1.

The driver circuit 18, referring to a comparison result of the hysteresis comparator 12, in the start-up mode and the normal mode, drives the switching transistor Tr1 based on the pulse width modulation signal Vpwm when the output voltage Vout is lower than a threshold voltage, and halts driving of the switching transistor Tr1 when the output voltage Vout is higher than the threshold voltage. Moreover, in the halt mode, driving of the switching transistor Tr1 is halted.

The voltage comparator 30 is provided for detecting a short-circuit state of a load, by monitoring the output voltage Vout of the separately excited DC/DC converter 210. The voltage comparator 30 compares the feedback voltage Vout' inputted to the plus (non-inverting) terminal, and the predetermined threshold voltage Vth' inputted to the minus (inverting) terminal, and when Vout'>Vth' outputs at a high level, and when Vout'<Vth' outputs at a low level. Below, the output of the voltage comparator 30 is referred to as a short-circuit detection signal Vsc. That is, the voltage comparator 30 detects the short-circuit state by comparing the output voltage Vout of the separately excited DC/DC converter 210 with the threshold voltage Vth=Vth'×(R1+R2)/R1. For example, in cases in which the target voltage Vtgt of the output voltage Vout is 300 volts, the threshold voltage Vth is set at approximately 30 volts.

Figure 3:
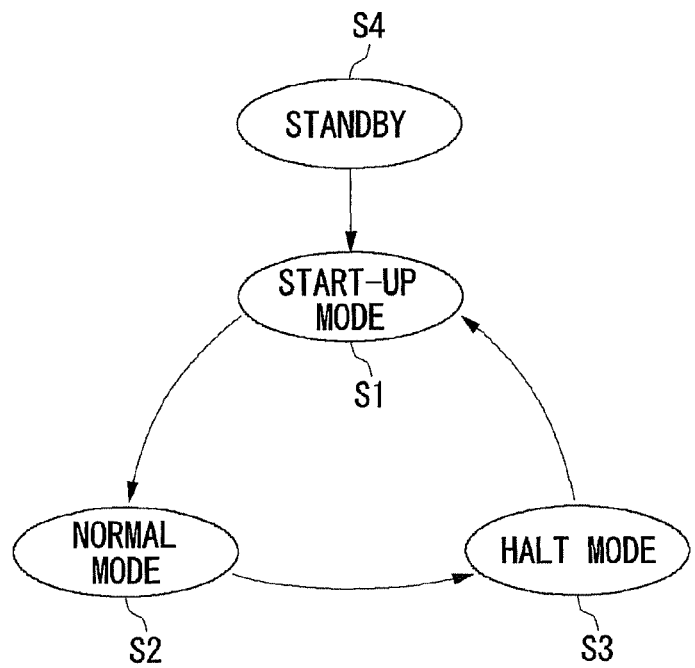
FIG. 3 is a state transition diagram of a state machine.

The short-circuit detection signal Vsc outputted from the voltage comparator 30 is inputted to the state machine 14. The state machine 14 holds control states of the switching transistor Tr1, that is, four states: the start-up mode, the normal mode, the halt mode, and standby mode. FIG. 3 is a state transition diagram of the state machine 14. When power is supplied to the electronic device 300, the state machine 14 is in a standby mode S4. After that, when an enabling signal EN inputted to the state machine 14 goes to a high level, there is a transition to the start-up mode S1. The enabling signal EN is given from outside the control circuit 100.

The state machine 14 makes detection of the short-circuit state by the voltage comparator 30 non-operative in the start-up mode S1, and after the start-up time Tp1 has elapsed, transits to the normal mode S2. The start-up time Tp1 is set to be longer than time required for the output voltage Vout to become higher than the threshold voltage Vth, after beginning start-up of the separately excited DC/DC converter 210.

Moreover, when the voltage comparator 30 detects the short-circuit state, in the normal mode S2, the state machine 14 transits to the halt mode S3. When the short-circuit detection signal Vsc outputted from the voltage comparator 30 continues at a high level for a predetermined short-circuit detection time Tp2, the state machine 14 may transit from the normal mode S2 to the halt mode S3.

In addition, the state machine 14 transits to the start-up mode S1 after the predetermined halt time Tp3 has elapsed after transiting to the halt mode S3, and begins the start-up of the separately excited DC/DC converter 210.

Furthermore, when a light emission control signal SIG20 outputted from the light emission controller 214b is inputted to the state machine 14, and a light-emitting operation of the light-emitting element 212 is completed in the normal mode S2, there is a transition to the start-up mode S1. That is, when the output voltage Vout of the separately excited DC/DC converter decreases by the light-emitting element 212, which is a load, being driven, in the normal mode S2, the state machine 14 transits to the start-up mode S1.

The state machine 14 outputs mode signals MODE1 and MODE2 expressing present state, to the driver circuit 18 and a soft start circuit 26, in each state. The state machine 14 performs required time measurement, that is, the start-up time Tp1, the short-circuit detection time Tp2, the halt time Tp3, and the like, using the timer circuit 16.

Figure 4:
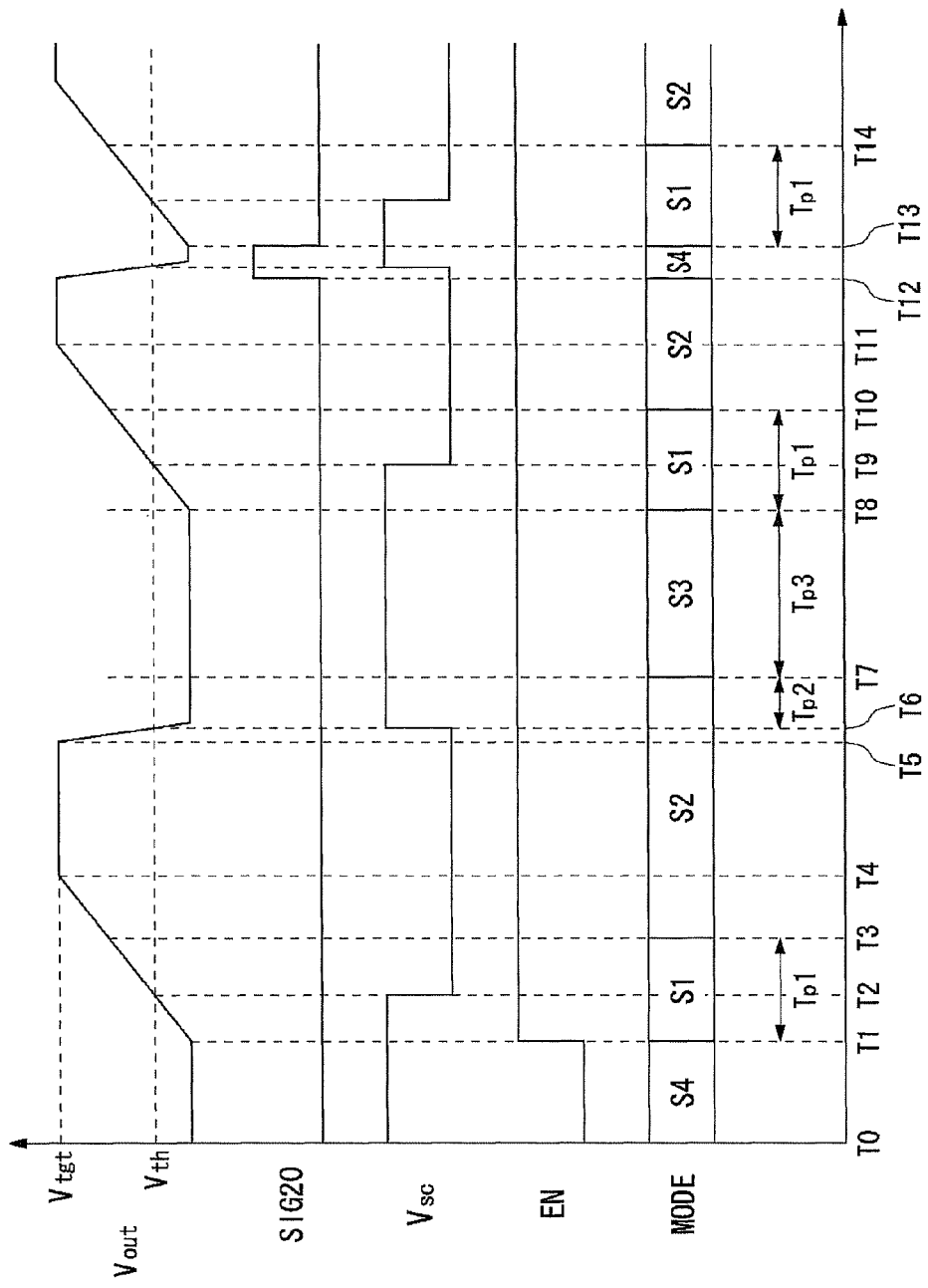
FIG. 4 is a time chart showing an operation state of the light-emitting device of FIG. 1.

An explanation is given of operations of the light-emitting device 200 configured as above. FIG. 4 is a time chart showing operation states of the light-emitting device 200 of FIG. 1.

At time T0, when power is supplied to the electronic device 300, the state machine 14 is in standby mode S4. At time T1, when the enabling signal EN goes to a high level, there is a transition to the start-up mode S1. When the start-up mode S1 occurs, the soft start circuit 26 is controlled by the mode signal MODE2 outputted from the sate machine 14, the duty ratio of the pulse width modulation signal Vpwm gradually becomes larger, and the output voltage Vout of the separately excited DC/DC converter 210 begins to gradually increase.

In a period from time T1 to time T2, the output voltage Vout is lower than the threshold voltage Vth. During this time, in the start-up mode S1, the state machine 14 makes detection of the short-circuit state by the voltage comparator 30 non-operative. At time T3 after elapse of the start-up time Tp1 from time T1, the state machine 14 transits from the start-up mode S1 to the normal mode S2. In the normal mode S2, monitoring of a short-circuit state by the voltage comparator 30 is operative.

At time T4, the output voltage Vout reaches the target voltage Vtgt, operation of the driver circuit 18 by the hysteresis comparator 12 is controlled, and stabilization is carried out so that Vout≈Vtgt. In FIG. 4, the output voltage Vout indicates a constant value, but in reality varies between voltages Vmax and Vmin determined by the hysteresis comparator 12.

At time T5 when the load short-circuits, the output voltage Vout suddenly drops, and just after that, the output voltage Vout at time T6 becomes lower than the threshold voltage Vth, and the short-circuit detection signal Vsc, which is output of the voltage comparator 30, goes to a high level. The short-circuit state of the load continues, and at time T7 after the short-circuit detection time Tp2 has elapsed after the short-circuit detection signal Vsc has gone to a high level, the state machine 14 transits from the normal mode S2 to the halt mode S3. At this time, the state machine 14 has the mode signal MODE2, which is outputted to the driver circuit 18, at a high level, and driving of the switching transistor Tr1 by the driver circuit 18 is halted.

At time T8 after the halt time Tp3 has elapsed after transiting to the halt mode S3, the state machine 14 transits to the start-up mode S1. The output voltage Vout in the start-up mode S1 rises again by a soft start operation. At this time, the load is assumed to be released from the short-circuit state. At time T9 the short-circuit detection signal Vsc goes to a low level, and at time T10, after the start-up time Tp1 has elapsed after beginning the start-up, the state machine goes to the normal mode S2. At time T11 the output voltage Vout reaches the target voltage Vtgt.

At time T12, when a user of the electronic device 300 presses a shutter of the imaging unit 316, the light emission control signal SIG20 outputted from the light emission controller 214b goes to a high level, the IGBT 214a is ON, and the light-emitting element 212 emits light. At this time, charge accumulated in the output capacitor C1 is discharged, and the output voltage Vout decreases suddenly. In the period in which the light emission control signal SIG20 has a high level, the state machine 14 is in the standby mode S4. After that, at time T13 the light emission control signal SIG20 goes to a low level, and the state machine 14 goes to the start-up mode S1. At time T14 after the start-up time Tp1 has elapsed from time T13, the state machine 14 transits to the normal mode S2.

According to the control circuit 100 according to the present embodiment, by switching the start-up mode S1 and the normal mode S2, and by switching the detection of the short-circuit state by the voltage comparator 30 between operative and non-operative, it is possible to distinguish between a state in which the load short-circuits and the output voltage Vout decreases, and a state in which, before the output voltage Vout at start-up time rises to its target value Vtgt, the output voltage Vout is lower than the threshold voltage Vth, and it is possible to halt the switching transistor Tr1 and realize circuit protection only in cases in which the load has really short-circuited.

Furthermore, after detecting a short-circuit state and halting switching operation of the switching transistor Tr1 for a halt time Tp3, in order for the switching controller 10 to begin the start-up of the separately excited DC/DC converter, in cases in which a long-term short-circuit of the load is maintained, since there is intermittent operation in which current flows during the start-up time Tp1 and current is shut off during the halt time Tp3, it is possible to prevent a large current flowing continuously in the switching transistor Tr1 or the transformer 50.

Moreover, with regard to the switching controller 10, when the output voltage Vout is continuously below the threshold voltage Vth for the short-circuit detection time Tp2, since the voltage comparator 30 determines that there is a short-circuit state, it is possible to preferably detect a long-term short-circuit state and perform circuit protection, without judging, as short-circuits, cases in which the output voltage Vout has decreased for a very short time.

In addition, when the output voltage Vout of the separately excited DC/DC converter decreases by the light-emitting element 212, which is a load, being driven, in the normal mode S2, the state machine 14 transits to the start-up mode S1, so that after emission of light the output voltage Vout is once again increased in the start-up mode S1, and in this time, detection of the short-circuit state by the voltage comparator 30 can be made non-operative.

The abovementioned embodiment is an example, and a person skilled in the art will understand that various modified examples in combinations of various component elements and various processes thereof are possible, and that such modified examples are within the scope of the present invention.

In the embodiment, an explanation of the DC/DC converter has been given concerning cases in which the light-emitting element 212 is driven; however, there is no limitation thereto, and various other loads requiring high voltage can be driven. In the present embodiment, an explanation has been given concerning cases in which the output voltage Vout of the separately excited DC/DC converter 210 decreases due to driving the load, that is, light emission from the light-emitting element 212; however, in cases in which the output voltage Vout does not decrease so much due to driving the load, a transition to the start-up mode S1 synchronous with driving the load, shown at time T13 in FIG. 4, need not be carried out.

In the embodiment, an explanation has been given concerning the separately excited DC/DC converter; however, a self-excited type is also possible.

Furthermore, in the present embodiment, setting of high level and low level logical values is one example, and it is possible to make changes freely, by appropriately making inversions by an inverter or the like.

The present invention has been explained based on the embodiment; however, clearly the embodiment merely shows principles and applications of the present invention, and many modified examples and changes to arrangements are possible within a scope that does not depart from the spirit of the present invention as prescribed in the scope of the claims.

While the preferred embodiments of the present invention have been described using specific terms, such description is for illustrative purposes only, and it is to be understood that changes and variations may be made without departing from the spirit or scope of the appended claims.

What is claimed is:

1. A control circuit which controls a switching operation of a switching transistor of a separately excited DC/DC converter, the control circuit comprising:

a switching controller which controls the switching operation of the switching transistor; and a voltage comparator which compares output voltage of the separately excited DC/DC converter and a predetermined threshold voltage, to detect a short-circuit state; wherein after a predetermined start-up time has elapsed after beginning start-up of the separately excited DC/DC converter, when the voltage comparator detects the short-circuit state, the switching controller halts the switching operation of the switching transistor, and makes detection of the short-circuit state by the comparator non-operative before elapse of the start-up time, and wherein the switching controller comprises:

a state machine which holds a control state of the switching transistor, the state machine comprising three modes: a start-up mode in which detection of a short-circuit state by the comparator is made non-operative, while executing a step-up operation by the separately excited DC/DC converter, a normal mode in which detection of a short-circuit state by the voltage comparator is performed, while executing the step-up operation by the separately excited DC/DC converter, and a halt mode in which the step-up operation by the separately excited DC/DC converter is halted, and a transition is made to the normal mode after the start-up time has elapsed after transiting to the start-up mode, a transition is made to the halt mode when the voltage comparator detects a short-circuit state when in the normal mode, and a transition is made to the start-up mode after the predetermined halt time has elapsed after transiting to the halt mode, and wherein the switching controller further comprises:

a pulse width modulator which generates a pulse signal, duty ratio of the pulse signal gradually changing in the start-up mode, and being fixed at a predetermined value in the normal mode and the halt mode;

a hysteresis comparator which compares the output voltage and a threshold voltage set in a vicinity of a target value of the output voltage and generates an overvoltage detection signal; and a driver circuit which drives the switching transistor based on the pulse signal while the overvoltage detection signal indicates a first level and stops the switching operation of the switching transistor while the overvoltage detection signal indicates a second level in the normal mode, and halts the switching operation of the switching transistor.

2. A control circuit according to claim 1, wherein after detecting the short-circuit state and halting the switching operation of the switching transistor for a predetermined halt time, the switching controller begins start-up of the separately excited DC/DC converter once again.

3. A control circuit according to claim 1, wherein the start-up time is set to be longer than time required for the output voltage to become higher than the threshold voltage, after beginning start-up of the separately excited DC/DC converter.

4. A control circuit according to claim 1, wherein, when the output voltage is continuously below the threshold voltage for a predetermined short-circuit detection time, according to the voltage comparator, the switching controller halts the switching operation of the switching transistor.

5. A control circuit according to claim 1, wherein, in the normal mode, when the output voltage of the separately excited DC/DC converter decreases due to driving a load, the state machine transits to the start-up mode.

6. A control circuit according to claim 1, wherein the switching controller further comprises a timer circuit, and the state machine operates using the timer circuit for required time measurement.

7. A power supply apparatus comprising:

a separately excited DC/DC converter comprising a switching transistor, and in which a step-up operation is controlled by putting the switching transistor ON and OFF; and a control circuit according to claim 1 which controls putting the switching transistor ON and OFF.

8. A light-emitting device comprising:

a power supply apparatus according to claim 7; and a light-emitting element which is driven by output voltage of the separately excited DC/DC converter of the power supply apparatus.

9. A battery-driven electronic device comprising:

an imaging unit; and a light-emitting device according to claim 8, used as a flash, when taking an image with the imaging unit; wherein the light-emitting device steps up battery voltage to drive the light-emitting element.

10. A control circuit which controls a switching operation of a switching transistor of a self-excited type DC/DC converter, the control circuit comprising:

a switching controller which controls the switching operation of the switching transistor; and a voltage comparator which compares output voltage of the self-excited DC/DC converter and a predetermined threshold voltage, to detect a short-circuit state; wherein after a predetermined start-up time has elapsed after beginning start-up of the self-excited DC/DC converter, when the voltage comparator detects the short-circuit state, the switching controller halts the switching operation of the switching transistor, and makes detection of the short-circuit state by the voltage comparator non-operative before elapse of the start-up time, and wherein the switching controller comprises:

a state machine which holds a control state of the switching transistor, the state machine comprising three modes: a start-up mode in which detection of a short-circuit state by the comparator is made non-operative, while executing a step-up operation by the separately excited DC/DC converter, a normal mode in which detection of a short-circuit state by the voltage comparator is performed, while executing the step-up operation by the separately excited DC/DC converter, and a halt mode in which the step-up operation by the separately excited DC/DC converter is halted, and a transition is made to the normal mode after the start-up time has elapsed after transiting to the start-up mode, a transition is made to the halt mode when the voltage comparator detects a short-circuit state when in the normal mode, and a transition is made to the start-up mode after the predetermined halt time has elapsed after transiting to the halt mode, and wherein the switching controller further comprises:

a pulse width modulator which generates a pulse signal, duty ratio of the pulse signal gradually changing in the start-up mode, and being fixed at a predetermined value in the normal mode and the halt mode;

a hysteresis comparator which compares the output voltage and a threshold voltage set in a vicinity of a target value of the output voltage and generates an overvoltage detection signal; and a driver circuit which drives the switching transistor based on the pulse signal while the overvoltage detection signal indicates a first level and stops the switching operation of the switching transistor while the overvoltage detection signal indicates a second level in the normal mode and halts the switching operation of the switching transistor.

11. A control circuit according to claim 1, wherein the switching controller and the voltage comparator are integrated on one semiconductor substrate.

* * * * *